United States Patent [19]

Hirose

[11] Patent Number: 5,253,337
[45] Date of Patent: Oct. 12, 1993

[54] METHOD AND APPARATUS FOR SEARCHING IMAGE INFORMATION

[75] Inventor: Kenji Hirose, Yokohama, Japan

[73] Assignee: Kabushiki Kaisha Toshiba, Kawasaki, Japan

[21] Appl. No.: 425,965

[22] Filed: Oct. 24, 1989

[30] Foreign Application Priority Data

Oct. 31, 1988 [JP] Japan .................. 63-275589

[51] Int. Cl.⁵ .......................................... G06F 15/106
[52] U.S. Cl. ..................................... 395/161; 395/155; 400/83
[58] Field of Search ................ 364/518, 521, 522; 340/747, 750; 400/63, 83; 395/161, 155, 144, 145, 146

[56] References Cited

U.S. PATENT DOCUMENTS 4,860,221 8/1989 Sato et al. ........................ 364/522
4,991,117 2/1991 Iwamura et al. .................. 364/521

Primary Examiner—Phu K. Nguyen
Attorney, Agent, or Firm—Finnegan, Henderson, Farabow, Garrett & Dunner

[57] ABSTRACT

An image information search apparatus includes an input unit inputting a search start instruction and a search stop instruction, an image information storage unit for storing a plurality of pieces of image information, and a searching unit for, in response to the search start instruction, referring to the image information storage unit to sequentially read out predetermined some of the plurality of pieces of image information and display the readout image information, and in response to the search stop instruction, stopping referring of the image information storage unit and displaying image information a predetermined number of pieces of image information before image information displayed upon stop. In high-speed search/display such as page or document turn over search, when stop of a display is instructed, image information displayed when stop is determined can be displayed again.

23 Claims, 4 Drawing Sheets

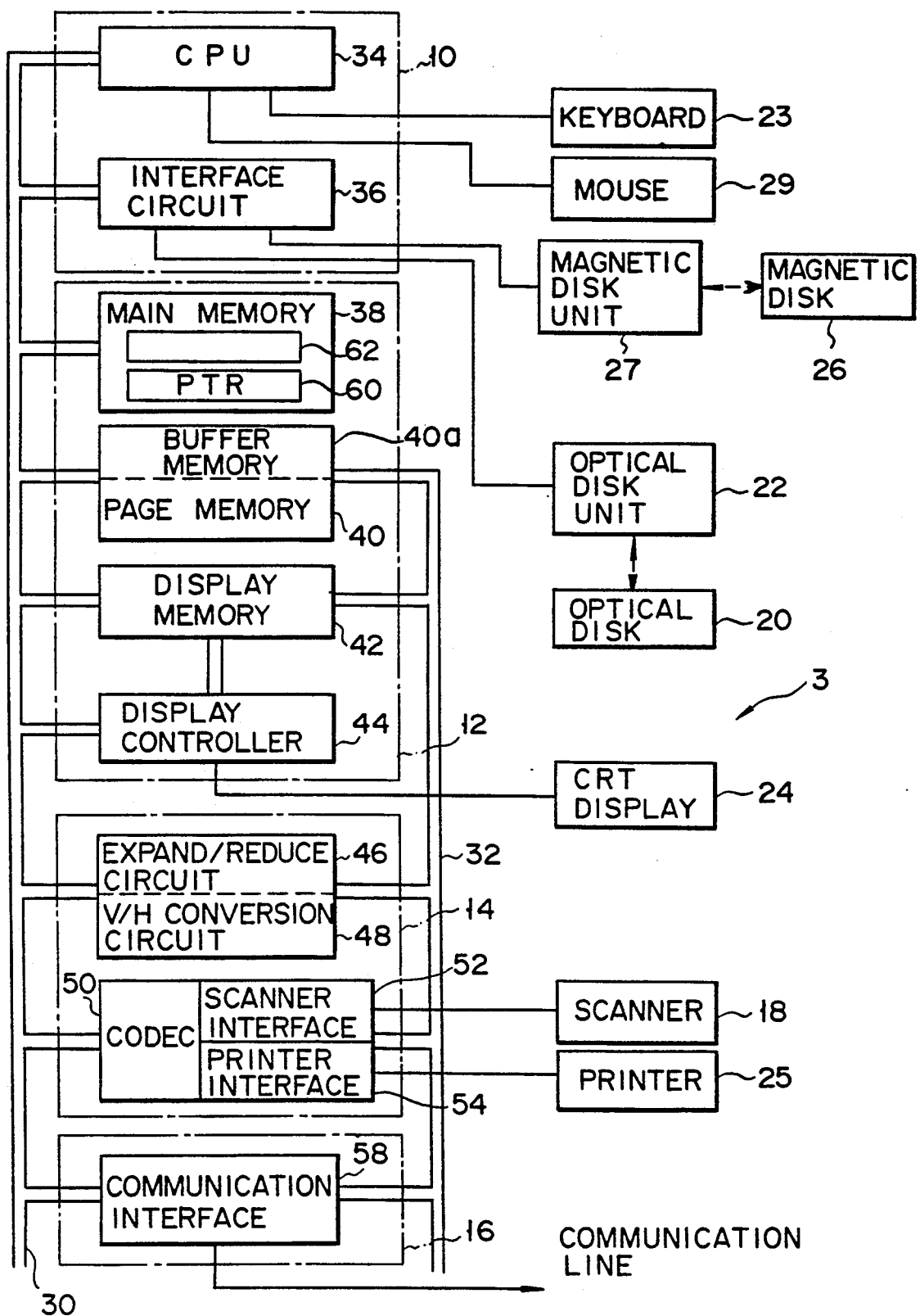
F I G. 1

DOCUMENT MANAGEMENT TABLE

| SEARCH INFORMATION | DOCUMENT NO. |
|---|---|
|  | 1 |
|  | 2 |
|  | 3 |
|  | 4 |

~26a

F I G. 4A

PAGE MANAGEMENT TABLE

| DOCUMENT NO. | PAGE NO. | RECORD NO. |
|---|---|---|
| 1 | 1 | 1 |
| 1 | 2 | 2 |
| 1 | 3 | 3 |
| 2 | 1 | 4 |

~26b

F I G. 4B

RECORD MANAGEMENT TABLE

|  | ADDRESS | LENGTH | ATTRI. | FREQUENCY |
|---|---|---|---|---|
| RECORD 1 |  |  |  | 10 |
| RECORD 2 |  |  |  | 5 |
| RECORD 3 |  |  |  | 7 |
| ⋮ |  |  |  |  |
|  |  |  |  |  |
|  |  |  |  | 26c |

F I G. 4C

METHOD AND APPARATUS FOR SEARCHING IMAGE INFORMATION

BACKGROUND OF THE INVENTION

1. Field of the Invention

The present invention relates to image information searching with good operability and, more particular, to a method of searching and displaying target image information taking into consideration the response time delay associated with the image information search. The present invention also relates to an image information searching apparatus for searching and displaying target image information.

2. Description of the Related Art

Recently, an image information searching apparatus for reading image information such as documents produced in a large amount by a scanner, storing the read image information in an optical disk, searching the stored image information, and outputting target image information to an output unit, e.g., a CRT display unit or a recording unit has become commercially available.

In such a searching apparatus, continuous search such as page turn-over search for sequentially displaying all pages of each of a plurality of documents or document's first page turn-over search for sequentially displaying only the first page of each of a plurality of documents is performed at high speed. When target image information is displayed during this high-speed continuous search, a user instructs the apparatus to stop the search by a key input. In response to this stop instruction, the continuous search is stopped. In this case, when the user finds the target image information and inputs the continuous search stop instruction, image information several pages or documents after the target image information is already displayed.

In high-speed continuous search, therefore, after an operator inputs a search stop instruction, he or she must perform processing to restore to the display the target image information several pages or documents before a currently displayed page. This is the result of the poor operability of the search apparatus.

SUMMARY OF THE INVENTION

It is, therefore, an object of the present invention to provide a method of searching image information taking into consideration a response time delay during high-speed search/display, thereby stopping search at target image information to achieve good operability, and an image information searching apparatus therefor.

In order to achieve the above object of the present invention, an image information search apparatus includes an input unit for inputting a search start instruction and a search stop instruction, an image information storage unit for storing a plurality of pieces of image information, and a searching unit for, in response to the search start instruction, referring to the image information storage unit to execute search processing for sequentially reading out predetermined some of the plurality of pieces of image information, and displaying the readout image information, and in response to the search stop instruction, stopping the search processing, and reading out and displaying image information a predetermined number of pieces of image information before image information displayed upon stop from the image information storage unit.

In order to achieve the above object of the present invention, a method in an image information searching apparatus, includes the steps of:
 generating a search start instruction;
 searching, in accordance with the search start pieces of image information stored in an image information storage unit and displaying the searched image information;
 generating a search stop instruction;
 stopping search of the image information storage unit in response to the search stop instruction; and
 displaying image information a predetermined number of pieces of image information before image information displayed upon stop.

According to the present invention as described above, there is provided an image information searching apparatus capable of stopping search at target image information desired by a use during high-speed search/display, thereby achieving good operability.

BRIEF DESCRIPTION OF THE DRAWINGS

FIG. 1 is a block diagram showing an arrangement of an image information searching apparatus of the present invention;

FIGS. 4A to 4C are views for explaining a management table; and

DETAILED DESCRIPTION OF THE PREFERRED EMBODIMENT

Figures 2, 5:
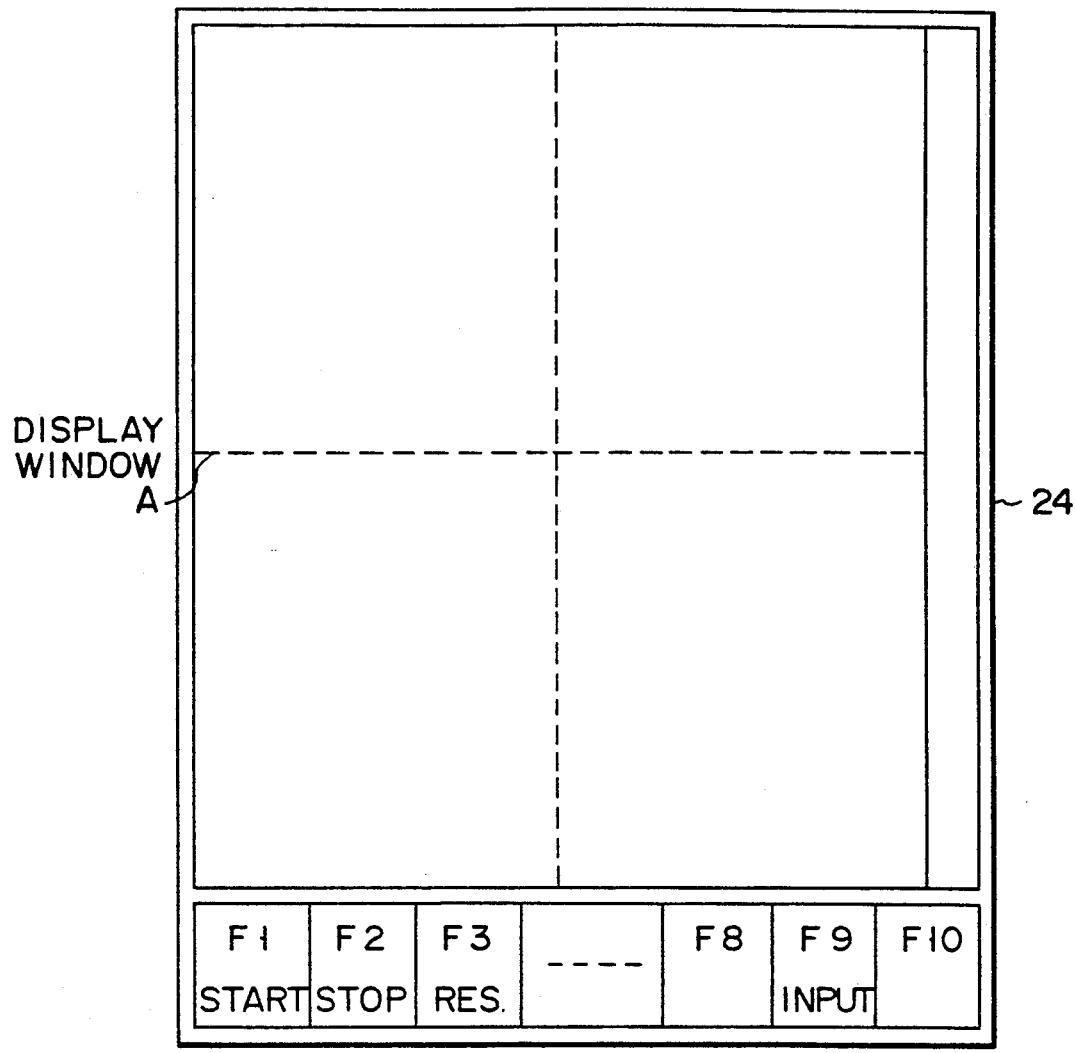
FIG. 2 is a view for explaining a detailed arrangement of a CRT display shown in FIG. 1.
FIG. 5 is a view showing a detailed format of a search record information table.
Figure 3:
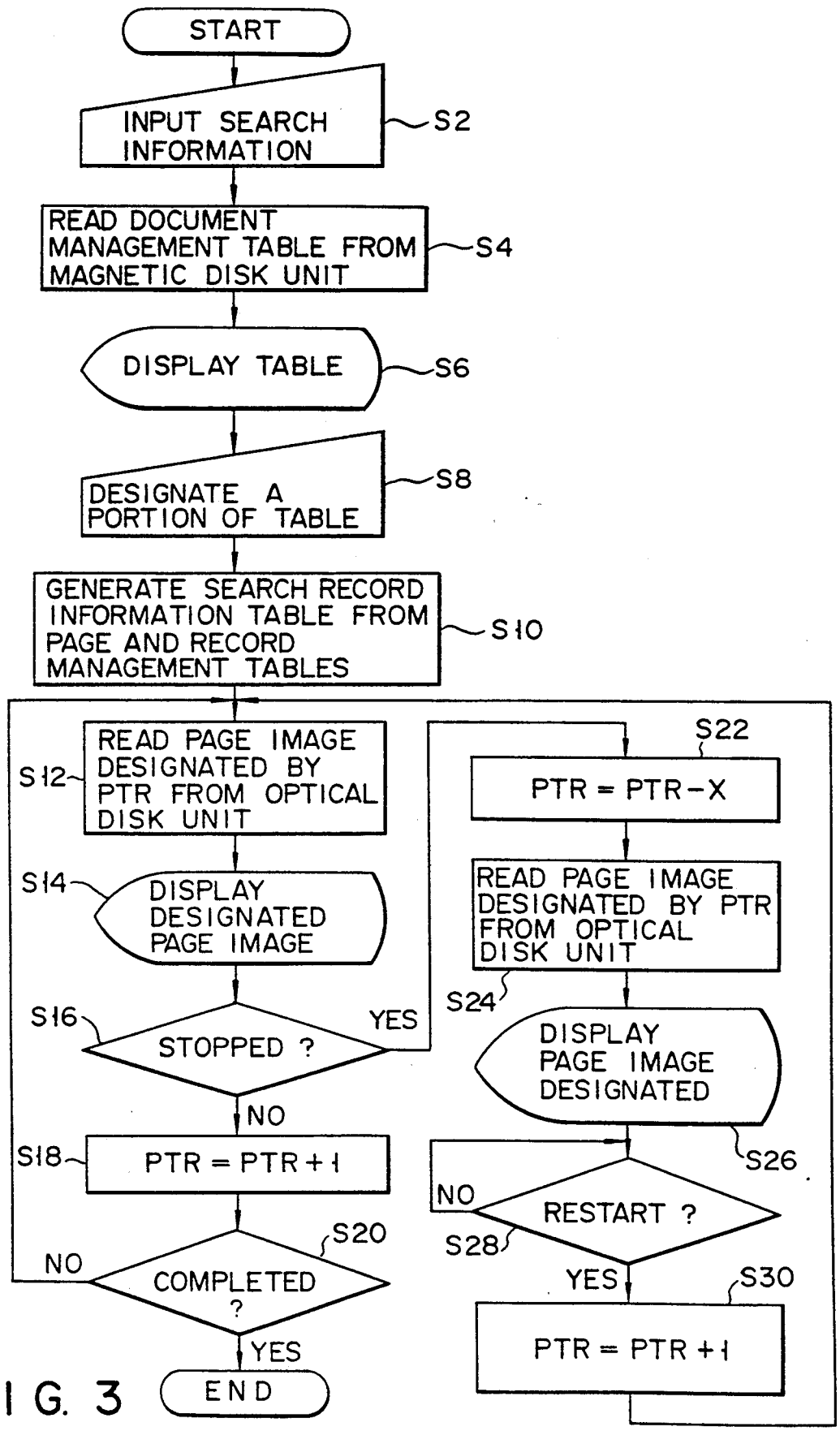
FIG. 3 is a flow chart for explaining a search operation.

An embodiment of an image information searching apparatus according to the present invention will be described in detail below with reference to the accompanying drawings.

An arrangement of the image information searching apparatus according to the embodiment of the present invention will be described with reference to FIG. 1. Referring to FIG. 1, the image information searching apparatus comprises a control module 10, a memory module 12, an image information processing module 14, a communication control module 16, a scanner 18, an optical disk 20, an optical disk unit 22, a keyboard 23, a CRT display 24, a printer 25, a magnetic disk 26, a magnetic disk unit 27, a mouse 29, a system bus 30, and an image information bus 32.

The control module 10 includes a CPU 34 and an interface circuit 36. The CPU 34 controls the overall operations of the apparatus, such as image information storage, search, and edit processing operations. In addition, in response to an input instruction, the CPU 34 generates various control commands. The interface circuit 36 connects the system bus 30 to the optical and magnetic disk units 22 and 27, respectively. The keyboard 23 and the mouse 29 are connected to the CPU 34 via an interface (not shown) and the bus 30. The keyboard 23 inputs search information corresponding to image information stored in the optical disk 20 and various instructions for storage, search, and edit processing operations. In addition, in a search mode, a search start instruction, a search stop instruction, a search restart instruction, and the like are input from the keyboard 23. A cursor (not shown) displayed on the CRT display 24, for example, is arbitrarily moved vertically or horizontally to select or designate a display content (e.g., various operation modes, area designation for image information editing, and an icon) at which the cursor is positioned.

The optical disk unit 22 sequentially stores image information in the optical disk 20 read by the scanner 18 (to be described later) and reads out image information corresponding to search information input by the keyboard 23 or the like from the optical disk 20. The magnetic disk unit 27 stores various control programs in the magnetic disk 26 mounted therein and stores a management table for managing each image information. The management table will be described later in detail below.

The memory module 12 includes a main memory 38, a page memory 40, a display memory 42, and a display controller 44. The main memory 38 has a table area 62 for storing the management table and a pointer 60 for designating management information for currently displayed image information, and stores the various control programs from the magnetic disk unit 27. The page memory 40 stores image information to be written in the optical disk 20 or image information read out therefrom <in an amount of several pages of, for example, an A4-size original. A part of the page memory 40 constitutes a buffer memory area 40a which serves as a buffer in communication with respect to the optical disk unit 22 via the interface circuit 36.

The display memory 42 stores display data to be displayed on the CRT display 24, e.g., image information. Image information to be actually displayed in a window of the display 24 is subjected to, e.g., expansion, reduction, rotation, insertion, or black/white reversal. In response to a display instruction from the CPU 34, the display controller 44 controls the display of display data stored in the display memory 42 on the CRT display 24. As shown in FIG. 2, a display area, i.e., a display window A of the display 24 can be divided into a maximum of four display subwindows, and four pieces of image information can be simultaneously displayed by using the display subwindows. Similar to image information to be displayed in the display window A, processing such as expansion, reduction, rotation, or scrolling can be independently performed for image information displayed in each display subwindow. Control functions of function keys F1 to F10 of the keyboard 23 are displayed in a lower portion of the display window A of the display 24. In the search mode, for example, search start (START), search stop (STOP), and search restart (RES.) are displayed as the keys F1, F2, and F3, respectively, as shown in FIG. 2. In addition, as the key F9, an input (INPUT) for selecting page turn-over search/document designated page turn-over search or inputting search information is displayed.

The image information processing module 14 includes an expand/reduce circuit 46, a vertical/horizontal (V/H) conversion circuit 48, a compress/expand circuit (CODEC 50, a scanner interface 42, and a printer interface 54. In response to a size expand/reduce instruction from the CPU 34, the expand/reduce circuit 46 executes expand/reduce processing for image information stored in the display memory 42 and writes the processing result again in the memory 42 via the image information bus 32. In response to a rotate instruction from the CPU 34, the V/H conversion circuit 48 execute rotate processing for image information stored in the display memory 42 and writes the processing result again in the memory 42 via the bus 32. When the CPU 34 simultaneously generates the expand/reduce and rotate instructions, the rotate processing is executed on the basis of the processing result from the expand/reduce circuit 46.

The CODEC 50 executes image information compress/ extend processing on the basis of an MH (Modified Huffman) or MR (Modified Read) scheme. In response to a data expand instruction from the CPU 34, the CODEC 50 executes data expand processing, i.e., decode processing for image information temporarily stored in the buffer memory area 40a and writes the processing result in the page memory 40. In addition, in response to a compress instruction, the CODEC 50 executes compress processing, i.e., code processing for image information stored in the page memory 40 and writes the processing result in the area 40a. The scanner interface 52 connects the scanner 18 to the image information bus 32, and the printer interface 54 connects the printer 25 to the bus 32. The scanner 18 two-dimensionally scans an original (document) with a laser beam and converts the original into image information. The printer 25 prints out image information read by the scanner 18, image information searched from the optical disk 20, or image information displayed on the CRT display 24.

The communication control module 16 is constituted by a communication interface 58 such as a BCP (Bus Communication Processor) to be connected to, e.g., a Local Area Network or LAN (not shown). The module 16 may include a UCP (Universal Communication Processor) for connecting external equipment such as a personal computer.

The system bus 30 connects the control module 10 to the memory module 12, the image information processing module 14, and the communication control module 16. The image information bus 32 connects the memory module 12 to the image information processing module 14 and the communication control module 16.

Image information storage and search processing operations in the image information searching apparatus having the above arrangement will now be described below.

A document management system in the image information searching apparatus of the present invention will be described first. The document management system of this embodiment has four hierarchical levels of cabinets, binders, documents, and pages. The cabinet corresponds to one side of the optical disk 20. A maximum of eight binders can be defined in the cabinet, and a maximum of 30,000 documents can be stored in each binder. Each document is constituted by a maximum of 4,095 pages. The type of each document is defined in units of binders. A document is a basic unit of a file. Each document has a title and can additionally include notes (explanation of the document).

Documents are managed by a management table. As shown in FIGS. 4A to 4C, the management table includes a document management table 26a, a page management table 26b, and a record management table 26c. Document numbers are written in the document management table 26a in a one-to-one correspondence with pieces of search information each including a plurality of search keys. In the page management table 26b, one page number corresponds to each page of each document, and one record number corresponds to each page number. In the record management table 26c, a logical address of image information in the optical disk 19, an image information length, an image information attribute such as a compress system or resolution, and a search frequency are written in correspondence with each record number.

The search frequency represents the number of search times of the corresponding image information and is updated each time the image information is searched. That is, each time image information is searched as target image information, the CPU 34 updates a corresponding search frequency in the record management table by "+1". For example, when certain page image information having a search frequency of "10" as shown in FIG. 4C is searched, the search frequency is updated to "11". Upon access, a physical track address and a physical sector address are calculated from the logical address.

Assume that the display window A is selected, a certain binder is selected, and a registration mode is selected by the keyboard 23. When the binder is selected, a management table concerning the binder is read out from the magnetic disk unit 27 and stored in the table area 62 of the main memory 38. Thereafter, search information for image information to be stored in the optical disk 20 is input. This search information is constituted by a plurality of items of search keys, and the contents of the items of the search keys are predetermined. The CPU 34 checks validity of a format of the input search information. In addition, the CPU 34 compares the input search information with registered search information to check double registration. In accordance with the check result, the input search information is registered in the management table stored in the table area 62 of the main memory 38.

A document original is then set on the scanner 18, and the CPU 34 generates an image information input instruction. In response to the image information input instruction, the scanner 18 two-dimensionally scans and photoelectrically converts image information of the set document original. Line information of the photo-electrically converted image information is sequentially stored in the page memory 40. The image information stored in the page memory 40 is transferred to the display memory 42 and displayed on the CRT display 24 by the display controller 44. A user checks a skew, a density, a resolution, and the like of the image information displayed on the display 24 and operates a storage key when the displayed image information is satisfactory. In response to an operation of the storage key, the CPU 34 determines a physical track address and a physical sector address in which the image information is to be stored. In addition, the CPU 34 outputs a compress instruction to the CODEC 50. The CODEC 50 reads out the image information from the page memory 40 and codes the readout image information by a known MR (Modified Read) scheme or the like. The coded image information is stored in the buffer memory are 40a, supplied to the optical disk unit 22 via the inter face circuit 36, and then stored in the optical disk 20 in accordance with the determined physical track an sector addresses.

After the CPU 34 stores the image information in the optical disk 20, in order to determine management information concerning the image information, the CPU 34 determines a logical address from the determined physical track and sector addresses and also determines an image information length, an image information attribute, and the like from a block length. In addition, a page number is input. The determined management information is written in the management table in the table area 62 of the main memory 38. Thereafter, the management table is supplied to the magnetic disk unit 27 and written in the magnetic disk 26.

Search processing for image information stored in the optical disk 20 will be described with reference to a flow chart shown in FIG. 5. In step S2, a search mode is set at the keyboard 23. At this time, as shown in FIG. 2, control functions of the function keys are displayed. For example, the function key F9 is operated to select page turn-over search or document designated page search. In this example, assume that page turnover search is selected. Search information corresponding to target image information to be searched is then input. In accordance with the input search information, the CPU 34 reads out a document management table of the management tables from the magnetic disk 26 and stores the readout table in the table area 62.

In step S6, the CPU 34 writes the document management table in the display memory 42. As a result, the document management table is displayed on the CRT display 24. In step S8, a user designates a range of page turn-over search in the document management table by, e.g., document numbers. The CPU 34 reads out a page management table including the document numbers of the designated range and a corresponding record management table and stores the readout tables in the table area 62. In step S10, a search record information table as shown in FIG. 5 is generated from the readout page and record management tables. Each search record information in the search record information table includes a document number, a page number, and a record number. The pieces of search record information are rearranged in an order of document names and then in an order of record numbers. CPU 34 then sets the value of the pointer (PTR) 60 to "0".

When the function key F1 is operated, i.e., when a search start instruction is input, in step S12, the CPU 4 reads out search record information designated by the PTR of "0" and obtains a record number in the search record information. In accordance with the obtained record number, the CPU 34 refers to the record management table and reads out a logical address. A physical track address and a physical sector address are calculated from the readout logical address, and image information is read out from the optical disk 20 by the optical disk unit 22 in accordance with the calculated addresses. The readout image information is stored in the buffer memory area 40a via the interface circuit 36. At this time, the CPU 34 generates an expand instruction. In response to the expand instruction, the CODEC 50 executes expand processing for the image information stored in the area 40a and stores the processed image information in the page memory 40. This image information is then supplied from the page memory 40 to the display memory 42. As a result, in step S14, the page image information stored in the display memory 42 is displayed on the CRT display 24.

In step S16, the CPU checks whether the function key F2 is operated, i.e., whether a search stop instruction is input. If N in step S16, step S18 is executed. If Y in step S16, step S22 is executed. In step S18, the CPU 34 increments the value of the PTR 60 by "1". In step S20, the CPU 34 checks whether the search processing is completed. If N in step S20, the processing in step S12 is executed for the PTR 60 of "1". Thereafter, each time image information designated by the PTR 60 is displayed on the CRT display 24, the PTR 60 is incremented by "1".

Assume that target image information is displayed while page turn-over search as described above is performed. At this time, a user determines that search must be stopped and operates the function key F2, i.e., the stop key on the keyboard 23, thereby inputting a search stop instruction. In response to the search stop instruction, the CPU 34 stops the search processing. At this time, since the search processing is performed at high speed, several pieces of image information are searched and displayed before the stop key is operated. When the search stop instruction is input, Y is determined in step S16, and step S22 is executed.

In step S22, the PTR 60 is decremented by "X". This value "X" is predetermined. For example, the value "X" may be related to a search processing speed. In this case, the value "X" may be determined by the search processing speed when the search information is input in step S2. When the value of the PTR 60 is "7" while the value "X" is "1", the value of the PTR 60 is set to "6". In step S24, similar to step S12, image information corresponding to the search record information designated by the PTR 60 is read out from the optical disk 20. The readout image information is displayed on the display 24 in step S26.

In step S28, the CPU 34 checks whether the function key F3 on the keyboard 23 is operated, i.e., whether a restart instruction is input. If Y in step S28, the flow advances to step S30, and the search processing is executed again while the value of the PTR 60 is updated.

The operation performed when page turn-over search is designated has been described above. An operation, however, is similarly performed when document turn-over search is designated. In this case, a page to be searched need not be the first page but can be a designated page. Note that in the case of document turn-over search, search record information is generated for each document.

As has been described above, in high-speed search processing such as page or document turn-over search, image information a predetermined number of pages or documents before currently displayed image information can be displayed in response to a search stop instruction. Therefore, operability can be improved to realize a better man-machine interface.

Note that a search speed of page or document turn-over search may be switched so that the number of image information to be returned upon stop is changed. Alternatively, a user may designate the number of image information to be returned upon stop. In this manner, even if users have different stop designation timings, image information desired by the users can be displayed. This is effective especially when a page or document turn-over search speed is high.

What is claimed is:

1. An image information searching apparatus, comprising:
    optical disk means for optically storing image information;
    management storage means for storing management data corresponding to the image information, including a plurality of corresponding document numbers, page numbers, record numbers, and logical addresses;
    means for generating, from the management data, a search record information table including sorted management data that is ordered in accordance with the corresponding logical addresses;
    means for inputting a desired search record;
    means for retrieving, using the search record information table, a logical address corresponding to the desired search record;
    readout means for sequentially reading, using the search record information table and beginning at the logical address corresponding to the desired search record, current image information from said optical disk means;
    display means for continuously displaying a screen image including the current image information that is sequentially read out by the readout means; and
    means for stopping the display of the current image information, and for causing the display means to display a previously read image information, wherein the previously read image information was read by the readout means and displayed by the display means a predetermined number of screen images before screen image corresponding to the current image information.

2. An apparatus according to claim 1, wherein said readout means includes means for determining a range of the image information with the input desired search record.

3. An apparatus according to claim 2, wherein said means for determining the range includes means for determining the range of the image information in accordance with pages of at least one designated document.

4. An apparatus according to claim 2, wherein said range includes image information corresponding to predetermined pages of designated documents.

5. An apparatus according to claim 1, wherein the previously read image information was displayed a predetermined number of screen images prior to the currently displayed image information.

6. An apparatus according to claim 5 wherein the predetermined number is proportional to a search speed at which the image information is sequentially read out from said optical disk means.

7. An apparatus according to claim 1, further comprising means for designating a search speed at which the image information is sequentially read out from said optical disk means, wherein the previously read image information was displayed a predetermined number of screen images prior to the currently displayed image information, and wherein the search speed is proportional to the predetermined number.

8. The apparatus according to claim 1, wherein the apparatus further includes an input device for inputting information including a predetermined number, and wherein the previously read image information was displayed a predetermined number of displays prior to the currently displayed image information.

9. An apparatus according to claim 8, wherein the predetermined number is related to a search speed at which image information is sequentially read out from said optical disk means.

10. An apparatus according to claim 9, wherein said input device further includes means for inputting the search speed.

11. A method of searching image information stored in an optical disk unit for desired image information, the method comprising the steps, performed by a data processing system, of:
    generating a search start instruction;

reading out in response to the search start instruction image information from the optical disk unit;

sequentially displaying the read-out image information to form a screen image;

generating a search stop instruction;

stopping the sequential display of the read-out image information in response to the search stop instruction; and displaying, after stopping the sequential display of the read-out image information, the read-out image information of a screen image that was displayed prior to the read-out image information that was displayed when the search stop instruction was generated.

12. A method according to claim 11, wherein said search stop instruction generating step includes the substep of:

generating search information, and said reading out step includes the substep of:

determining a range of said desired image information in accordance with the search information.

13. A method according to claim 11, wherein said desired image information corresponds to pages of at least one designated document.

14. A method according to claim 11, wherein each of said desired image information corresponds to a predetermined page of each of designated documents.

15. A method according to claim 11, wherein the predetermined number corresponds to a search speed at which said desired image information is read out from said optical disk unit.

16. A method according to claim 15, wherein said first generating step further includes designating the search speed.

17. The method according to claim 11 wherein the step of displaying the read-out image information of the screen image that was displayed before the search stop instruction includes the substep of:

forming a screen image by displaying read-out image information that was displayed a predetermined number of screen images prior to the currently displayed screen image.

18. The method according to claim 17 wherein the predetermined number is proportional to a search speed at which the image information is sequentially read out from said optical disk means.

19. An image information searching apparatus, comprising:

optical disk means for storing image information;

a management table in which at least document numbers, page numbers, record numbers, and logic addresses of the optical disk means are stored;

means for generating from the management table a search record information table in which document numbers, page numbers, and record numbers are sorted;

input means for inputting search record information;

means for obtaining the logical address from the management table, in accordance with the input search record information;

reading means for sequentially reading out the image information;

display means for displaying to-be-searched image information corresponding to the image information read by the reading means;

instructing means for generating an instruction to stop the display means; and restoring means for causing, in response to the stop instruction, said reading means to stop reading the image information, and said display means to display to-be-searched image information corresponding to previously read image information.

20. An apparatus according to claim 19, wherein said designation means includes means for designation search information, and said reading means includes means for determining the to-be-searched image information in accordance with the search information.

21. An apparatus according to claim 19, wherein said to-be-searched image information corresponds to pages of at least one designated document.

22. An apparatus according to claim 19, wherein each of said to-be-searched image information corresponds to a predetermined page of each of designated documents.

23. An apparatus according to claim 19, wherein the display means displays screen images including the to-be-searched image information and wherein a screen image corresponding to the to-be-searched image information caused to be displayed by the restoring means was displayed by the display means a predetermined number of screen images prior to a screen image currently being displayed by the display means.

* * * * *